(12) United States Patent
Harris et al.

(10) Patent No.: US 8,282,903 B2
(45) Date of Patent: Oct. 9, 2012

(54) METHOD FOR RECOVERING NITRIC ACID AND PURIFYING SILVER NITRATE ELECTROLYTE

(75) Inventors: Bryn Harris, Montreal (CA); Carl White, Douglastown (CA); Vicken Aprahamian, Gatineau (CA)

(73) Assignee: Royal Canadian Mint, Ottawa, Ontario (CA)

( * ) Notice: Subject to any disclaimer, the term of this patent is extended or adjusted under 35 U.S.C. 154(b) by 0 days.

(21) Appl. No.: 12/666,029

(22) PCT Filed: Jun. 23, 2008
(Under 37 CFR 1.47)

(86) PCT No.: PCT/CA2008/001159
§ 371 (c)(1),
(2), (4) Date: Jun. 8, 2010

(87) PCT Pub. No.: WO2009/000072
PCT Pub. Date: Dec. 31, 2008

(65) Prior Publication Data
US 2012/0014860 A1 Jan. 19, 2012

Related U.S. Application Data

(60) Provisional application No. 60/945,725, filed on Jun. 22, 2007.

(51) Int. Cl.
*C01B 21/46* (2006.01)
*C22B 11/00* (2006.01)

(52) U.S. Cl. ............... 423/394.2; 75/733; 423/390.1

(58) Field of Classification Search .... 423/390.1–394.2; 204/334, 571, 902, 903, 904, 911; 205/334, 205/551, 553, 565, 571, 780.5; 75/733
See application file for complete search history.

(56) References Cited

U.S. PATENT DOCUMENTS

| | | | | |
|---|---|---|---|---|
| 3,647,373 | A * | 3/1972 | Huska et al. | 423/626 |
| 3,851,041 | A * | 11/1974 | Eickmeyer | 423/223 |
| 3,851,047 | A | 11/1974 | Bailey | |
| 3,852,412 | A * | 12/1974 | Brenner | 423/394.2 |
| 4,205,054 | A * | 5/1980 | Sugahara et al. | 423/390.1 |
| 5,441,712 | A * | 8/1995 | Duyvesteyn et al. | 423/99 |

FOREIGN PATENT DOCUMENTS

| | | |
|---|---|---|
| CH | 614 238 A5 | 11/1979 |
| JP | 10 338509 A2 | 12/1998 |
| JP | 10338509 A2 * | 12/1998 |

* cited by examiner

*Primary Examiner* — Steven Bos
*Assistant Examiner* — Justin Bova
(74) *Attorney, Agent, or Firm* — Sheema Khan; Miltons IP/p.i.

(57) ABSTRACT

A processes for the regeneration of a silver nitrate and nitric acid based electrolyte as used in certain silver refining processes is based on the hydrolytic removal of undesired metal-based compounds such as water insoluble hydrolysable base metal cations and water insoluble hydrolysable base metal nitrates from which the soluble silver nitrate and nitric acid based electrolyte may be separated. Water is added slowly to a dewatered electrolyte melt held at a predetermined, elevated, temperature while allowing nitric acid thereby formed to evolve and be separated from the melt while the water insoluble base metal salts are formed. The melt is then diluted with water to dilute the silver nitrate contained therein and the insoluble base metal salts are separated from the mixture by filtration.

16 Claims, No Drawings

METHOD FOR RECOVERING NITRIC ACID AND PURIFYING SILVER NITRATE ELECTROLYTE

FIELD OF THE INVENTION

The present invention relates to processes for the regeneration of an acid-based electrolyte through a hydrolysis process in order to remove undesirable metal-based compounds from such electrolyte. More particularly, it relates to a process for regenerating nitric acid based electrolytes such as the silver nitrate and nitric acid based electrolyte as used in certain prior art processes, including the electrolytic refining of silver using such electrolyte. The process of the current invention further comprises the hydrolytic removal of undesired metal-based compounds from the silver nitrate and nitric acid based electrolyte. Further, the metal nitrates other than silver nitrate which are in the nitric acid solution may be substantially purified into insoluble compounds and separated from the solution by filtration for processing or use.

BACKGROUND OF THE INVENTION

Electrolytic silver refining is normally carried out according to the Moebius or Balbach-Thum processes. The common contaminating metals, in particular copper, are an impediment to the refining process. These contaminating metals are dissolved and concentrated in the electrolyte. In typical silver nitrate baths used for electrolytic silver refining, a copper content of about 60 g/L is considered to be the maximum permissible value. In excess of this value, cathodic deposition of copper may occur whereby Cu salts are trapped in the refined silver so that the purity requirements are no longer met. In situations where there is an excess of copper, entrapment of metal salts also occurs. Therefore, the used electrolyte must be restored to being "fresh" electrolyte having a lower Cu content from time to time.

In the past, silver refining has been performed by electrolyte recycling. The electrolyte recycling, i.e., removal of contaminating metals was typically accomplished by solvent extraction techniques. Swiss Patent No 614,238 describes a method employing solvent extraction for the removal of copper from silver nitrate electrolytes. The extractants used in this patent are commonly chelating agents such as phenoximes or quinolines, and remove substantially all of the copper, and associated metals such as nickel, from the silver nitrate electrolyte.

In silver refining electrolysis, it is necessary that the electrolyte have silver ions in solution. Due to the simultaneous dissolution of Cu and Ag at the anode of the refining cell, more Ag is deposited at the cathode and removed from the electrolyte than is dissolved at the anode. As a result, the electrolyte becomes deficient in silver and more concentrated in copper. To compensate for the depletion of Ag in the electrolyte, pure silver nitrate (in solution form) must be added to the regenerated electrolyte. This is a handicap for the process, as pure silver nitrate is an expensive product.

It is well known that copper and copper-containing compounds are a common contaminant in the silver nitrate/nitric acid solution that is used as an electrolyte in a Moebius-type silver refining process. It would be desirable to provide a method for effectively and relatively inexpensively removing this very soluble copper from a nitric acid and silver nitrate based-solution.

U.S. Pat. No. 3,851,047 describes a hydrometallurgical process whereby a nitric acid solution which contains ferric nitrate is treated by the process consisting of: 1) flash evaporation of the solution at about the boiling temperature of the azeotropic mixture to produce an "over head" of substantially pure nitric acid which is collected and a "bottom" of ferric nitrate, other nitrates, and ferric hydroxide, and 2) hydrolyzing the "bottom" to convert the ferric nitrates to nitric acid. Such nitric acids may be further collected and concentrated for re-use of the nitric acid.

U.S. Pat. No. 5,441,712 describes a hydrometallurgical process for producing zinc oxide which includes the step of producing a solution of zinc nitrate (which is soluble). Following which, the zinc nitrate solution is subjected to thermal hydrolysis to decompose very soluble zinc nitrate to substantially insoluble zinc oxide, the zinc oxide being thereafter recovered by an appropriate process such as by filtration. This reference further describes a process whereby water vapor formed during the process recombines with the gaseous nitric oxides produced during the pyrohydrolysis step to form nitric acid of acceptable strength for re-use in the process of the invention.

It would be desirable to provide a system to regenerate the nitric acid and silver nitrate based electrolyte that is required for the electrolysis of silver according to a Moebius-type process, especially if such a system was provided with an apparatus and reactants that are easily available and inexpensive in comparison to those used and described in the prior art.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

In a general embodiment of the current invention, solutions that are the by-products of the electrolytic process of silver refining are fed to a hydrolysis reactor system. In one embodiment of the invention, this solution is nitric acid-based and substantially comprises nitric acid and silver nitrate, with further undesirable impurities such as nitrates of copper, lead, zinc, iron, and other divalent, trivalent and tetravalent base metals which qualify as hydrolysable base metal cations. It is believed that under certain thermal conditions, substantially all hydrolysable base metal nitrates and base metal cations can be substantially or significantly hydrolysed to form water insoluble metal oxides, hydroxides or basic nitrates. As silver nitrate is not hydrolysable under these conditions, it is able to remain substantially in solution during the hydrolysis of the other base metal nitrates contained in a given solution. By taking advantage of this fact, it is possible to take an impure solution including silver nitrate and other non-silver metal nitrates and hydrolysable base metals that, when hydrolyzed form insoluble products and to substantially remove these insoluble products.

By another feature of the invention, concentrated nitric acid may be produced from a solution containing hydrolysable base metal nitrates.

There are three major steps that occur in the hydrolysis process. Initially, the solution to be recycled is fed into a reactor system where it undergoes an evaporation or "dewatering" step to drive off substantially all of the unbound (free) water and free nitric acid. Such evaporated nitric acid may typically be collected in a condenser and recycled within the flowsheet. After the evaporation step, the substantially water-free hot and highly concentrated salt mixture liquor melt which now occupies the reactor is further heated to a higher pre-determined temperature, said pre-determined temperature being dependent on the nature of the impurities that are to be removed from the liquor melt. Through the introduction of water into the melt, base metal nitrates are hydrolysed into water-insoluble compounds, while palladium and other minor elements are hydrolyzed into insoluble oxy-hydroxides for subsequent separation by filtration. Finally and optionally, the mixture is diluted with water back to the desired concentration of silver nitrate, this concentration being suitable to prevent crystallisation of the silver nitrate and for re-use within the refining flowsheet, followed by the removal of solids through filtration.

The invention, in one embodiment, addresses a process for the generation of nitric acid from a solution containing at least one hydrolysable metal nitrate which is insoluble in water when hydrolyzed comprising the steps of:
a) substantially dewatering said initial solution to drive off any unbound water and free nitric acid if present therein and to provide a melt of said dewatered solution;
b) establishing the temperature of the melt at a predetermined temperature range for hydrolyzing the at least one hydrolysable base metal nitrate;
c) injecting water into said melt while maintaining the temperature of the melt at the predetermined temperature range for hydrolyzing the at least one base metal nitrate to hydrolyze the at least one hydrolysable base metal nitrate and form nitric acid;
d) allowing formed nitric acid to evolve and separate from the melt;
e) collecting the formed nitric acid.

More particularly, the invention addresses a process for the generation of a silver nitrate electrolyte from a solution containing at least silver nitrate and a deleterious quantity of at least one hydrolysable metal nitrate which is insoluble in water when hydrolyzed comprising the steps of:
a) substantially dewatering said initial solution to drive off any unbound water and free nitric acid if present therein and to provide a melt of said dewatered solution;
b) establishing the temperature of the melt at a predetermined temperature range for hydrolyzing the at least one hydrolysable base metal nitrate;
c) injecting water into said melt while maintaining the temperature of the melt at the predetermined temperature range for hydrolyzing the at least one base metal nitrate to hydrolyze the at least one hydrolysable base metal nitrate and form nitric acid;
d) allowing formed nitric acid to evolve and separate from the melt;
e) collecting the formed nitric acid.

In a further embodiment, the above process further comprises the steps of
f) adding further water to the melt to dilute at least the silver nitrate containing nitric acid solution in said melt and to thereby form a solution containing silver nitrate with insoluble hydrolyzed base metal salts contained therein, and
g) separating said insoluble hydrolyzed base metal salts from the silver nitrate solution,
thereby to provide a nitric acid aqueous solution that is substantially reduced in its content of said at least one hydrolysable base metal nitrate which is insoluble in water when hydrolyzed The process for separating the silver nitrate solution from the insoluble solid base metal-containing impurities according to the above-mentioned steps will now be discussed in more detail.

The first part of the sequence of the current invention comprises the evaporation of free water and free nitric acid from the solution. As water and free acid evolve, the temperature of the liquid in the vessel is increased preferably to a temperature of at least 120.5° C. During this step the volume of the solution drops and the concentration of nitrate salts increases. The evaporation step occurs as the solution is heated and typically approaches completion above the azeotrope of 68% nitric acid in water, which is about 120.5° C., and more preferably is concluded at a temperature closer to the temperature at which the following step is to occur. More preferably, the temperature during the initial evaporation step may have a convenient end point that falls within the range of 130 to 140° C.

Heating and agitation of the nitrate melt in the reactor is effected throughout the next stage. The temperature of the contents of the reactor during this process should be at least about 125-130° C. but more preferably the target temperature set point may be in the range of 160-190° C. and preferably may be approximately 175° C., e.g. within 2° C. or 3° C. of this temperature. Higher temperatures such as up to 240° C. or 250° C. are also possible, subject to the undesirable consequence of producing nitrous oxide gases. Above 200° C., the base metal de-nitration step continues to occur in the absence of waters of hydration. Consequently, nitrous oxide gases are released which require capture using gas scrubbing equipment thereby losing the advantage of being able to simply capture and concentrate nitric acid. Base metal nitrates begin forming basic oxides.

Once the predetermined set-point temperature is reached, it is maintained at or about this predetermined temperature as a water injection step begins. Preferably, deionized water should be used. Maintaining the temperature in such a way is important to promote the hydrolysis of the base metals, and to therefore cause substantial evolution of the nitric acid that is generated by such hydrolysis. If the temperature of the contents of the reactor drops below 160° C., it is possible that the hydrolysis reaction would be retarded. Such injection may comprise the injection of liquid water or steam. Injection of steam will assist in maintaining the temperature of the melt although the injection of water may be easier to manage mechanically and in terms of safety. Any temperature of liquid water would be equally effective to effect hydrolysis. The injection step is preferably performed slowly such that the nitric acid produced is of a high concentration, but the step may comprise a higher speed of water injection if so desired.

The nitrate melt is preferably agitated through the use of an agitating mechanisms such as an impeller, and baffles are preferably provided on the interior sidewalls of the reactor in order to further encourage consistent mixing of the melt. A slowly metered injection of water below the agitator impeller promotes a hydrolysis reaction to proceed to the right as indicated in the equations below:

$$2Cu(NO_3)_2 + 3H_2O \rightarrow Cu(OH)_2 \cdot Cu(OH)NO_3 + 3HNO_3 \qquad (1)$$

A substantially similar reaction will occur with the zinc substituted for copper, and for other hydrolysable base metal nitrates.

The reaction for iron, however, is:

$$2Fe(NO_3)_3 + 3H_2O \rightarrow Fe_2O_3 + 6HNO_3 \qquad (2)$$

A substantially similar reaction will occur for aluminum, also producing an oxide or hydroxide phase.

It is advantageous to inject the water into the body of the melt, preferably below the impeller in order to get maximum dispersion of the water throughout the liquid phase. If water is just dropped onto the surface of the melt, the water largely flashes off and the reaction does not proceed to as substantial a degree as if it is injected below the surface. It should be noted that the water is being used in this case as a reagent, not merely as a solvent which is its usual role.

By using a slower water injection step, more of the nitric acid that is generated from the hydrolysis reactions that occur is able to leave melt and be removed from contact with the melt in the reaction vessel. This further drives the reaction towards the right as described in the above equations.

X-Ray Diffraction (XRD) analysis of the final solids produced by this process has shown that the basic nitrate, as defined by the formula in equation (1) is the product that is formed. Evaporated water, along with nitric acid, is captured by a condenser which collects vapours evolved from the thermal reactor. In a preferred embodiment of the current invention, means for directing the evolved nitric acid vapour towards the condenser inlet is provided. Such means may be in the form of an air or inert gas sweep stream introduced into the reactor headspace such that the air or gas stream draws the evolved vapour into the condenser inlet. The evolved vapour may also be drawn into the condenser inlet through diffusion arising from a partial vacuum formed by the condenser. The nitric acid collected during this phase is typically more concentrated than that which was condensed in the evaporation stage. The acidic condensate collected may be transferred to a storage vessel for use as a reagent in other processes.

It should be noted that during the distillation of nitric acid, it is preferable that nitrogen oxides ($NO_x$) not be formed. This sets the preferred upper limit to the reaction to the temperature at which the thermal decomposition of the base metal nitrates begins to occur substantially, e.g. at about 200° C.

The endpoint of the hydrolysis process occurs when water ceases to be absorbed in the reactions, above, the acidity of the condensed nitric acid is at a maximum and the melt is substantially free of nitric acid. The end point of the process may be conveniently detected through determination of the pH of the condensate by acid titration or other acid level determination methods as would be evident to a person skilled in the art. When the end-point is reached, heating is stopped and the injection of water is continued, preferably at a higher rate and in the form of liquid water at a lower temperature, to both reduce the temperature of the liquid phase and to dilute back the contents of the reactor.

During the step of dilution, water is re-injected continuously until a pre-determined reactor solution level is reached. Sufficient water is preferably added such that the solution does not freeze or crystallize to form solid silver and copper nitrates even at ambient temperature. By re-injecting water into the melt that is now substantially free of nitric acid and which now contains a number of precipitated insoluble base metal compounds, the soluble silver nitrate may be separated from the insoluble base metal compounds by any method familiar to those skilled in the art, such as vacuum or pressure filtration.

The liquid silver nitrate electrolyte—now substantially free of solid impurities—may then be returned to be used in the electrolytic process, while the precipitated solid impurities can be further processed to recover desirable components contained therein at, for example, a copper refinery. The nitric acid condensate can be used to generate fresh silver nitrate solution from raw silver to be used in the electrolysis process.

The examples in the above are directed to copper and zinc However, it will be apparent to those skilled in the art that any hydrolysable metal cation, such as lead, nickel, iron, cadmium, and other divalent, trivalent and tetravalent base metals will behave in a similar manner.

The foregoing summarizes the principal features of the invention and some of its optional aspects. The invention may be further understood by the description of the preferred embodiments which now follow.

DETAILED DESCRIPTION OF EMBODIMENTS OF THE INVENTION

The description which follows, and the embodiments described therein are provided by way of illustration of examples of particular embodiments of principles and aspects of the present invention. These examples are provided for the purposes of explanation and not of limitation of those principles of the invention. Wherever ranges of values are referenced within this specification, sub-ranges therein are intended to be included within the scope of the invention unless otherwise indicated. Where characteristics are attributed to one or another variant of the invention, unless otherwise indicated, such characteristics are intended to apply to all other variants of the invention where such characteristics are appropriate or compatible with such other variants.

The process will now be exemplified by reference to the following examples.

EXAMPLE 1

500 mL of spent silver refinery electrolyte, analyzing 81.1 g/L Ag, 66.4 g/L Cu and 4.78 g/L Zn was heated up to 160° C., driving off unbound water and free nitric acid. Cold water was then injected into the concentrated electrolyte at the rate of 1 mL/minute for a period of 2.5 hours while further nitric acid was evolved and separated from the solution and while the temperature was maintained at 160° C. Nitric acid distilled from the solution at this stage reaching a maximum concentration of 205 g/L. At the end of the injection period, heating was stopped, and water was slowly added to the solution to return the volume to its original value. This back-dilution occurred at a rate sufficient to ensure that the liquid phase did not freeze. The insoluble salts were then separated from the electrolyte by filtration. The concentration of the final solution was 77.1 g/L Ag, 24.5 g/L Cu and 4.3 g/L Zn. The recovered solids analyzed 0.07% Ag, 50.7% Cu and 0.64% Zn, representing the removal of 60.4% of the copper and 10.0% of the zinc in the original solution. X-Ray Diffraction analysis of the solids showed them to be basic copper nitrate.

EXAMPLE 2

1000 mL of spent silver nitrate solution, 58.3 g/L Cu and 7.18 g/L Zn, was heated up to 165° C. while dilute nitric acid was separated from the solution by distillation. Once dilute nitric acid ceased to evolve, steam at 105° C. was injected into the reactor vessel and further more concentrated nitric acid was allowed to evolve and be separated by distillation. With the addition rate of the steam at about 4 mL/minute, the temperature increased to 175° C. Steam at 105° C. was added for a period of 2.5 hours, and then heating was stopped. Nitric acid distilled from the solution at this stage reaching a maximum concentration of 112 g/liter. Upon ceasing steam injection and without being cooled or being allowed to substantially cool, the solution was diluted back to its original volume through the addition of cold water. The insoluble salts were then separated from the electrolyte by filtration. The analysis of the final solution showed the presence of 8.03 g/L Cu and 5.31 g/L Zn. which is generally equivalent to reductions of 86.2% for Cu and 26% for Zn of the amounts present in the original solution. The cumulative mass of nitric acid recovered was equivalent to that of the copper precipitated assuming the formation of basic copper nitrate.

EXAMPLE 3

500 mL of spent silver nitrate solution containing 38.75 g Ag, 30.5 g Cu and 2.44 g Zn was heated up to 175° C., to dewater the solution and drive off free nitric acid. At this point water was injected into the solution while maintaining the temperature at 175° C. The addition rate of the water was about 2 mL/minute initially, and then was dropped to 1 mL/minute after about an hour. Nitric acid distilled from the solution at this stage reaching a maximum concentration of 258 g/L. Water was added for a period of 3.25 hours, and then heating was stopped. The solution was then diluted back to its original volume through the addition of cold water. The analysis of the final solution showed the presence of 16.5 g/L Cu and 4.23 g/L Zn which is generally equivalent to reductions of 72.9% for Cu and 13.3% for Zn of the amounts present in the original solution. The cumulative mass of nitric acid recovered was equivalent to that of the copper precipitated assuming the formation of basic copper nitrate.

EXAMPLE 4

System Without Water Injection 1000 mL of the same spent silver nitrate solution as used in Example 2 was heated up to 190° C., and the temperature maintained for one hour. Contrary to Examples 1-3 wherein water was injected to promote hydrolysis, no water was added in this example process. No nitric acid was distilled off during this operation. A small amount of nitric acid was distilled off due to thermal decomposition of the hydrated copper nitrate. Some nitrogen oxide gases were also released during this step. The solution was then rapidly diluted back to its original volume with hot water. During the initial phase of dilution, a small amount of nitric acid evaporated and was recovered, analyzing 104 g/L as its overall concentration during this initial dilution step. The final solution after dilution showed only a 10% drop in copper concentration and no drop in zinc concentration.

These examples demonstrate that the addition of water, either as cold water, hot water or as steam, at a rate that permits the nitric acid to evolve and be separated from the solution is necessary to effect the hydrolysis of copper and zinc from the silver nitrate solutions. Simple heating of the solution and diluting back is not effective in substantially removing the copper, nor does it recover a substantial amount of nitric acid. Adding water as a reagent is necessary to effect the hydrolysis of both copper and zinc from the nitrate electrolyte. This water must be added at a rate that allows nitric acid being formed to escape from the melt and at a rate that allows the temperature in the reaction vessel to be substantially constant. A reasonably practical lower limit of water dosing flowrate based upon the tested starting solution volumes of 500 mL of spent silver nitrate solution was found in the laboratory to be on the order of 0.3 mL of water/min.

Although the foregoing description relates to specific preferred embodiments of the present invention and specific processes for the removal of impurities from a silver nitrate—nitric acid based solution as presently contemplated by the inventors, it will be understood that various changes, modifications and adaptations, may be made without departing from the spirit of the invention.

Conclusion

The foregoing has constituted a description of specific embodiments showing how the invention may be applied and put into use. These embodiments are only exemplary. The invention in its broadest, and the more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The invention claimed is:

1. A process for the generation of nitric acid and a silver nitrate electrolyte from an initial solution containing: i) at least one hydrolysable base metal nitrate which is insoluble in water when hydrolyzed; and ii) silver nitrate, the process comprising the steps of:
    a) substantially dewatering the initial solution to drive off any unbound water and free nitric acid and to provide a melt of the dewatered solution that includes silver nitrate therein;
    b) applying a heat source to establish the temperature of the melt at a predetermined temperature range for hydrolyzing the at least one hydrolysable base metal nitrate;
    c) injecting water into the melt while maintaining the temperature of the melt at the temperature range for hydrolyzing the at least one base metal nitrate to hydrolyze the at least one hydrolysable base metal nitrate and form i) nitric acid; and ii) at least one insoluble hydrolyzed base metal salt;
    d) allowing formed nitric acid to evolve and separate from the melt;
    e) collecting the formed nitric acid until the melt is substantially free of nitric acid;
    f) ceasing application of the heat source to the melt;
    g) adding further water to the melt to form a solution containing silver nitrate with the at least one insoluble hydrolyzed base metal salt contained therein, and
    h) separating the at least one insoluble hydrolyzed base metal salt from the silver nitrate solution, thereby to provide an aqueous solution-that is substantially reduced in its content of the at least one hydrolysable base metal nitrate which is insoluble in water when hydrolyzed.

2. A process as in claim 1 wherein the step of substantially dewatering the initial solution comprises raising the temperature of the solution to a temperature above the azeotropic temperature of nitric acid in water.

3. A process as in claim 1, wherein the step of substantially dewatering the initial solution comprises raising the temperature of the solution to a temperature between 122° C. and 130° C.

4. A process as in claim 1, wherein the temperature range is from 160° C. to 190° C.

5. A process as in claim 4 wherein the temperature range is from 172° C. to 178° C.

6. A process as in claim 1, wherein the step of injecting water into the melt is performed with a water injection rate that does not cause the temperature of the melt to fall outside of the temperature range.

7. A process as in claim 1, wherein the step of adding further water to the melt is continued to a degree such that the solution does not freeze or crystallize at ambient temperature.

8. A process as in claim 1, wherein the step of collecting nitric acid comprises using a sweep gas to drive nitric acid that evolves from the melt to a condenser unit.

9. A process as in claim 1, wherein the step of collecting nitric acid comprises using a partial vacuum to drive nitric acid that evolves from the melt to a condenser unit.

10. A process as in claim 1, wherein the step of injecting water into the melt is performed until the oxidation-reduction potential of the gas escaping the melt has a value of 600 mV.

11. A process as in claim 1, wherein the step of injecting water into the melt comprises injecting steam into the melt.

12. A process as in claim 1, wherein the step of injecting water into the melt comprises injecting liquid water into the melt.

13. A process as in claim 1, wherein the at least one hydrolysable base metal nitrate is selected from the group consisting of nitrates of divalent base metals, trivalent base metals and tetravalent base metals.

14. A process as in claim 13, wherein the at least one hydrolysable base metal nitrate is a nitrate of copper, zinc, lead, aluminum or iron.

15. A process as in claim 14, wherein the at least one hydrolysable base metal nitrate is a nitrate of copper or zinc.

16. A process as in claim 1, wherein vacuum filtration or pressure filtration is used to separate the at least one insoluble hydrolyzed base metal salts from the silver nitrate solution in step (h).

* * * * *